United States Patent
Schober et al.

(10) Patent No.: US 7,318,703 B2
(45) Date of Patent: Jan. 15, 2008

(54) IMPELLER FOR A PUMP

(75) Inventors: Martin Schober, Molln (AT); Gerald Feichtinger, Wartberg (AT)

(73) Assignee: Bitter Engineering & Systemtechnik GmbH, Neuzeug (AT)

( * ) Notice: Subject to any disclaimer, the term of this patent is extended or adjusted under 35 U.S.C. 154(b) by 0 days.

(21) Appl. No.: 10/531,421

(22) PCT Filed: Oct. 16, 2003

(86) PCT No.: PCT/AT03/00312

§ 371 (c)(1),
(2), (4) Date: May 10, 2005

(87) PCT Pub. No.: WO2004/036054

PCT Pub. Date: Apr. 29, 2004

(65) Prior Publication Data

US 2006/0034687 A1    Feb. 16, 2006

(30) Foreign Application Priority Data

Oct. 16, 2003    (AT) ................. A 1578/2002

(51) Int. Cl.
*F04D 29/30*    (2006.01)
(52) U.S. Cl. ................. 416/185; 416/243; 416/223 B; 415/206
(58) Field of Classification Search ............ 416/183, 416/185, 186 R, 188, 189, 192, 195, 223 R, 416/223 B, 234, 238, 243; 415/204, 206
See application file for complete search history.

(56) References Cited

U.S. PATENT DOCUMENTS

| | | | | |
|---|---|---|---|---|
| 2,710,580 A | * | 6/1955 | Holzwarth | 416/186 R |
| 4,389,160 A | * | 6/1983 | Onal | 416/186 R |
| 4,594,052 A | * | 6/1986 | Niskanen | 416/185 |
| 4,904,159 A | * | 2/1990 | Wickoren | 416/183 |
| 5,039,320 A | * | 8/1991 | Hoglund et al. | 96/214 |
| 5,209,641 A | | 5/1993 | Hoglund et al. | |
| 5,242,268 A | * | 9/1993 | Fukazawa et al. | 416/188 |
| 6,106,230 A | * | 8/2000 | Burgess | 416/186 R |
| 6,139,274 A | | 10/2000 | Heer | |
| 6,224,335 B1 | * | 5/2001 | Parisi et al. | 415/206 |
| 6,755,615 B2 | * | 6/2004 | Chapman | 415/206 |

FOREIGN PATENT DOCUMENTS

| | | | | |
|---|---|---|---|---|
| EP | 0760428 | | 3/1997 | |
| FI | 31749 A | * | 11/1961 | 416/186 R |
| GB | 466259 A | * | 5/1937 | 416/223 B |
| GB | 1277416 A | * | 6/1972 | 416/183 |

* cited by examiner

*Primary Examiner*—Ninh H. Nguyen
(74) *Attorney, Agent, or Firm*—Dykema Gossett PLLC

(57) ABSTRACT

An impeller for a pump, particularly for a cooling water pump of an internal combustion engine, includes a hub (11), a cover disc (14) which is disposed on the intake side and is provided with a central opening (15) for sucking in a conveyed medium, and at least one blade (13) that is connected to the cover disc (14) located on the intake side so as to form a single piece therewith and is provided with an inner section (13a) located in the region of the central opening and an outer section (13b) located in the region of the cover disc (14). The impeller achieves a high degree of efficiency yet is easily produced by embodying the impeller (5) in a completely open manner on the pressure side lying opposite the cover disc (14) and by configuring the inner section (13a) of the blade (13) in a three-dimensionally bent manner while configuring the outer section (13b) thereof in an essentially two-dimensionally bent manner.

14 Claims, 5 Drawing Sheets

IMPELLER FOR A PUMP

BACKGROUND OF THE INVENTION

1. Field of the Invention

The invention relates to an impeller for a pump, especially for a cooling water pump of an internal combustion engine, comprising a hub, a cover disk which is disposed on the intake side and is provided with a central opening for sucking in a conveyed medium, and with a blade which is joined integrally with the cover disk on the intake side and is provided with an inner section located in the region of the central opening and an outer section located in the region of the cover disk.

2. The Prior Art

The impellers of radial pumps are used as cooling water pumps of motor vehicles, for example, are predominantly configured as so-called closed impellers. This means that blades are enclosed between two cover disks, as a result of which closed flow conduits are formed with the impeller. Such closed impellers allow achieving high pumping efficiencies. The disadvantageous aspect is, however, that the production of such impellers is complex. Such a production can occur, for example, in two-part form in such a way that, on the one hand, a cover disk is produced with blades formed thereon, and on the other hand, the other cover disk is produced separately from one another and are joined to form the final impeller. Such a solution is shown in U.S. Pat. No. 2,710,580 A. It is also possible to produce such an impeller in an integral way in a casting method. A complex multi-part casting mold is required for this purpose which is provided with a plurality of slides which shape the flow conduits.

In order to enable the configuration of such an impeller in a simple and cost-effective way, it is desirable to design an impeller which can be produced with a simple two-part casting mold. DE 40 40 200 A shows such a solution in which the impeller comprises a cover disk on the pressure side and a cover disk on the intake side, between which the blades are arranged. The cover disk on the intake side comprises a central opening whose internal diameter is larger than the outside diameter of the disk on the pressure side. Insofar as the blades are configured without undercuts, such an impeller can be produced in a two-part form because the removal from the mold is easily possible. The disadvantageous aspect in such an impeller is however that the efficiency is relatively low and substantially lower than in the closed impellers as a result of the mandatory geometrical conditions. There is a further easy to produce solution with an impeller with plain blades and a respectively lower efficiency. The predominant aspect in the function is the rotation in both directions.

It is known to improve the pumping efficiency of radial pumps or axial pumps by using three-dimensionally curved blades. Such a solution is described for example in DE 100 50 108 A. The production of such impellers is very difficult and is not suitable for mass production for reasons of cost effectiveness and process technology. DE 197 42 023 A discloses an impeller composed of several segments in which the individual parts are easy to produce, but in total are complex and therefore difficult to produce. A further impeller with totally three-dimensionally curved blades is described in JP 59165895 A. The production is also complex in this case too.

It is the object of the present invention to provide an impeller for a pump which avoids these disadvantages and combines the advantage of easy production with high efficiency.

SUMMARY OF THE INVENTION

It is provided in accordance with the invention that the impeller is provided with a completely open configuration on the pressure side opposite of the cover disk and that the blade is curved at least in the interior section in a three-dimensional manner and is provided in the outer section with a substantially two-dimensional curvature. The relevant aspect in the invention is that it is managed through a special embodiment of the blade to achieve high efficiencies even in an open impeller. In this case, an impeller which is open on the intake side is not used as in the known pumps for dirt-laden media or the like, but an impeller is used which is open on the pressure side. A three-dimensional curvature within the terms of the invention is understood as a configuration of the blades which comprises not only a curved form in the radial direction but also an included position or a curvature in the axial direction.

In the case of conveying tenacious media, the impeller can be provided with a single plate. Generally, several blades will be provided.

It is theoretically possible that the blades are curved in a three-dimensional manner in their entirety within the above terms, which thus would lead to the achievement of the highest efficiencies. In such a solution, it is necessary when using a two-part casting mold to move the two mold halves during the removal of the mold not only linearly but also to twist the same at the same time, meaning that the casting molds are guided in a screwing movement. This requires a certain effort which although it is less than the provision of slides as in the state-of-the-art, should also be avoided if possible. It was noticed within the course of the development work that a large part of the possible improvement of the efficiency is already achieved when the impeller is curved three-dimensionally in the inner section, meaning that it is curved in a substantially screw-like manner, so that in the outer section a conventional two-dimensional form can be maintained. When the blades in the inner section are free from coverings or undercuts (i.e. when the rear edge of a blade lies in the axial direction before the front edge of the next blade), then the impeller can be produced in a two-part shape and can be removed from the mold by a simple translatory movement of the two mold halves.

The impeller can be produced in this manner in a simple way, e.g. in a diecasting method or also a plastic injection molding method. It is also possible to use steel casting or grey casting methods. Sheet forming techniques may be used under certain circumstances.

It has been noticed that it is especially advantageous to increase the efficiency when an axial projection is provided on the cover disk in the region of the opening which projects in the direction of the intake side. This allows providing the intake region which is especially critical with respect to flow with an optimal configuration.

An especially simple production of the impeller and also the pump per se can be achieved when the blades are provided at least in the second section on the pressure side with a face surface which is situated in the plane perpendicular to the axis of the impeller.

In an especially appropriate embodiment of the invention it is provided that the blades have a convex surface which converges smoothly from the first to the second section. The occurrence of cavitation effects can be avoided to a substantial extent and an optimal flow deflection can be achieved. It can further be provided that the blades have a concave surface which converges with an edge from the first section to the second section, thus ensuring an easy removability from the mold. A particularly simple solution provides that the blades have a substantially rectangular cross section in the second section. A substantially rectangular cross section is designated in this case as a cross section having the minimally required casting inclines, meaning that it is substantially trapezoid.

In order to achieve a more favorable transition with respect to the flow technology from the inner section to the outer section of the blades, it can be provided that the blades are provided in the second section at least partly with the trapezoid cross section. The trapezoid cross section will be formed mainly in that in the inner region of the outer section and converge outwardly generally into a substantially rectangular cross section.

The impeller in accordance with the invention is especially suitable for radial pumps, even though a configuration for axial pumps is possible. It is advantageous especially for the first case when the diameter d of the opening of the cover disk corresponds to 30% to 70%, preferably approximately 50% of the diameter of the impeller. An especially high efficiency can be achieved in this way.

The present invention further relates to a pump, especially a cooling water pump for an internal combustion engine, with a bearing in which a pump shaft is held rotatably which passes through a wall of the housing and to which is fastened an impeller with axial intake opening on the side of the housing wall opposite of the bearing and with preferably radial discharge, which is equipped with an impeller as described above. Such a pump can be produced easily and at low cost and comes with a high efficiency. The pump can be driven in the known manner by belts or even in an electromotive manner.

It is especially preferable when in the housing wall there is provided an axial face seal for sealing the pump shaft which lies open in the flow of the conveying medium. It has been noticed that the service life of an axial face seal can be increased when the same is not only subjected statically to the conveying medium the when it is also flushed by the same regularly in order to securely prevent dry running. The leakage quantities can thus also be reduced in this manner. It is especially advantageous for the efficiency when the housing wall is directly adjacent to a face surface of the blades. The gap width between the housing wall and the blades is set to the amount as required at a minimum by tolerances and thermal expansion.

The present invention is now explained in closer detail by reference to the embodiments shown in the drawings.

DETAILED DESCRIPTION OF THE PREFERRED EMBODIMENT

Figure 1:
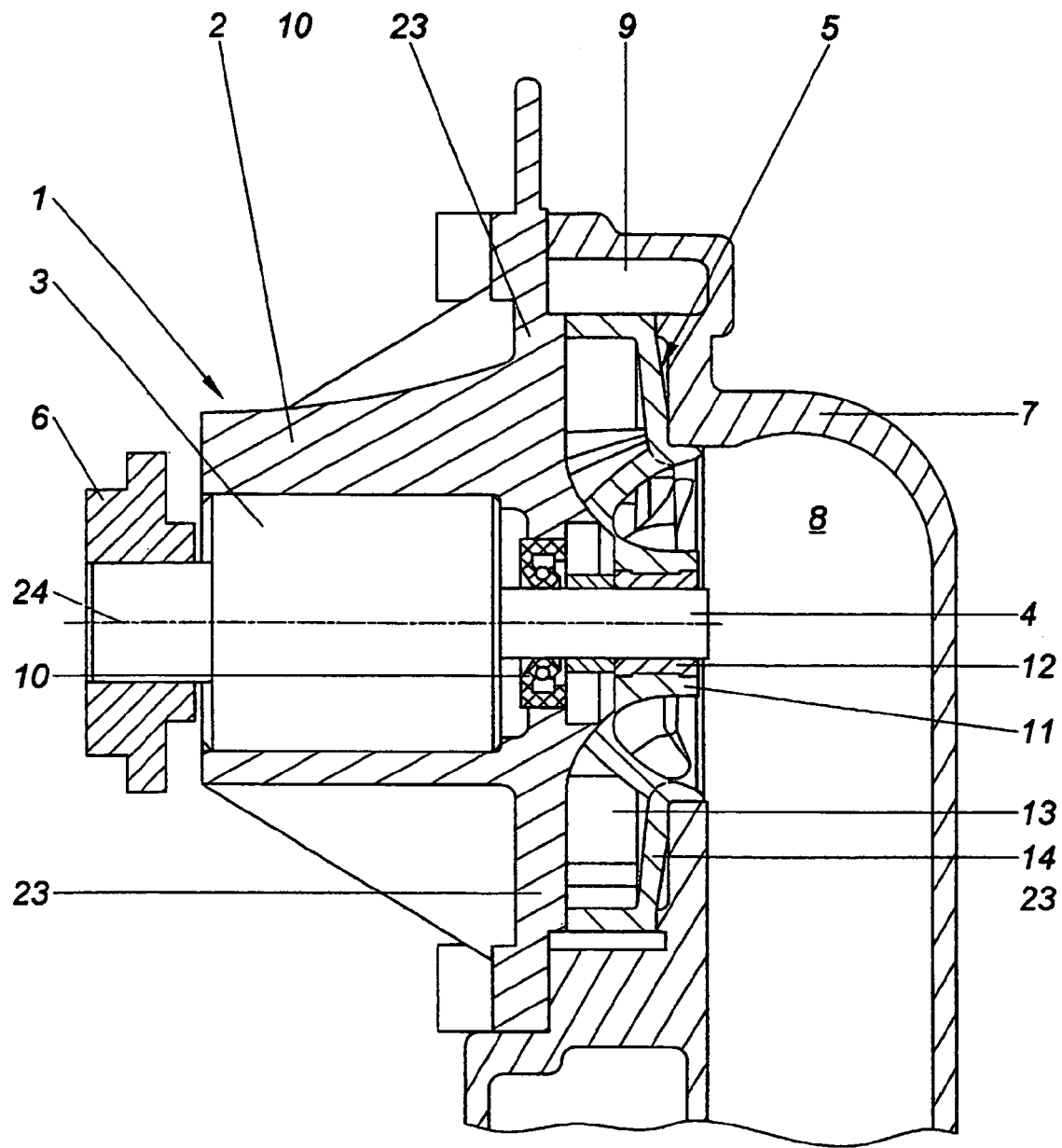
FIG. 1 shows a sectional view through a radial pump in accordance with the invention with an impeller according to the invention.
Figure 2:
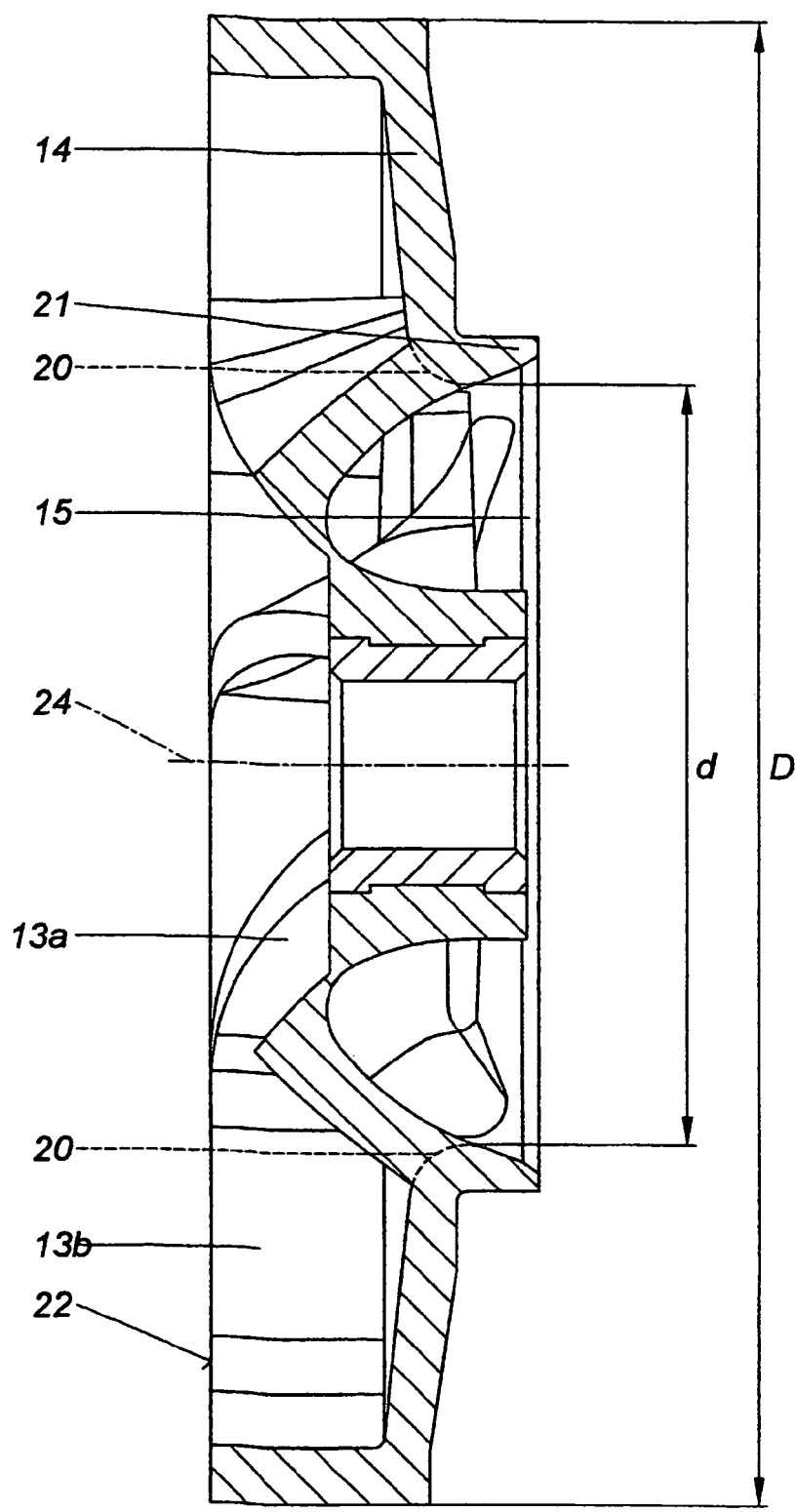
FIG. 2 shows a sectional view of the impeller of FIG. 1 on an enlarged scale.
Figure 3:
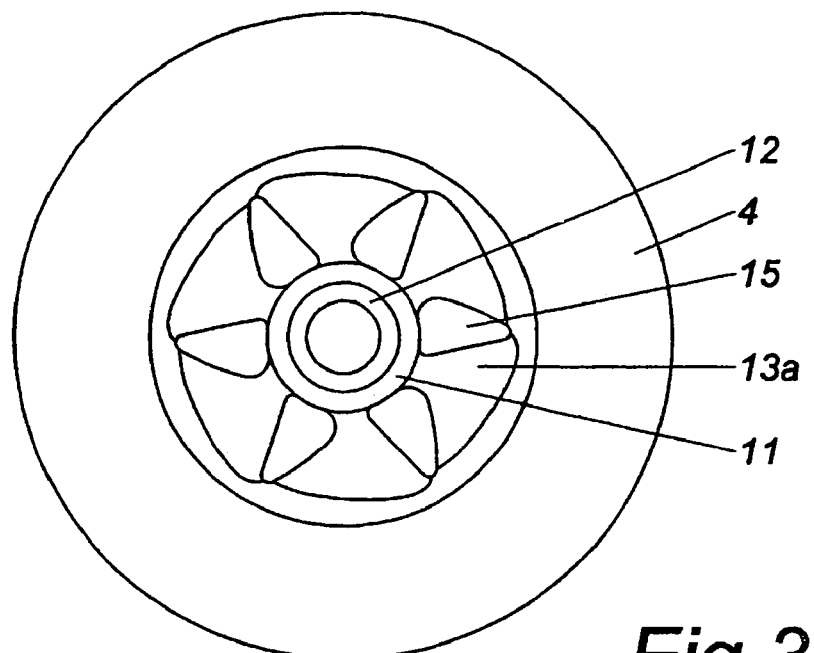
FIGS. 3 and 4 show views of the impeller in accordance with the invention from the intake side and from the pressure side.
Figure 4:
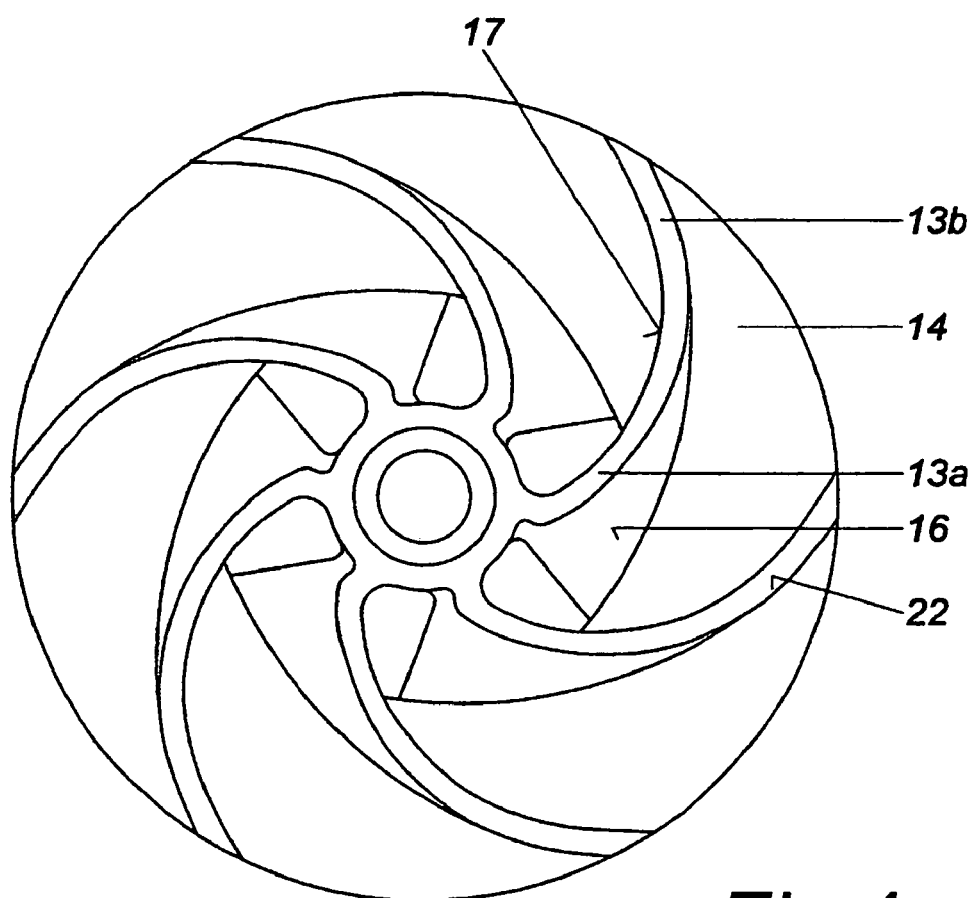
Figure 5:
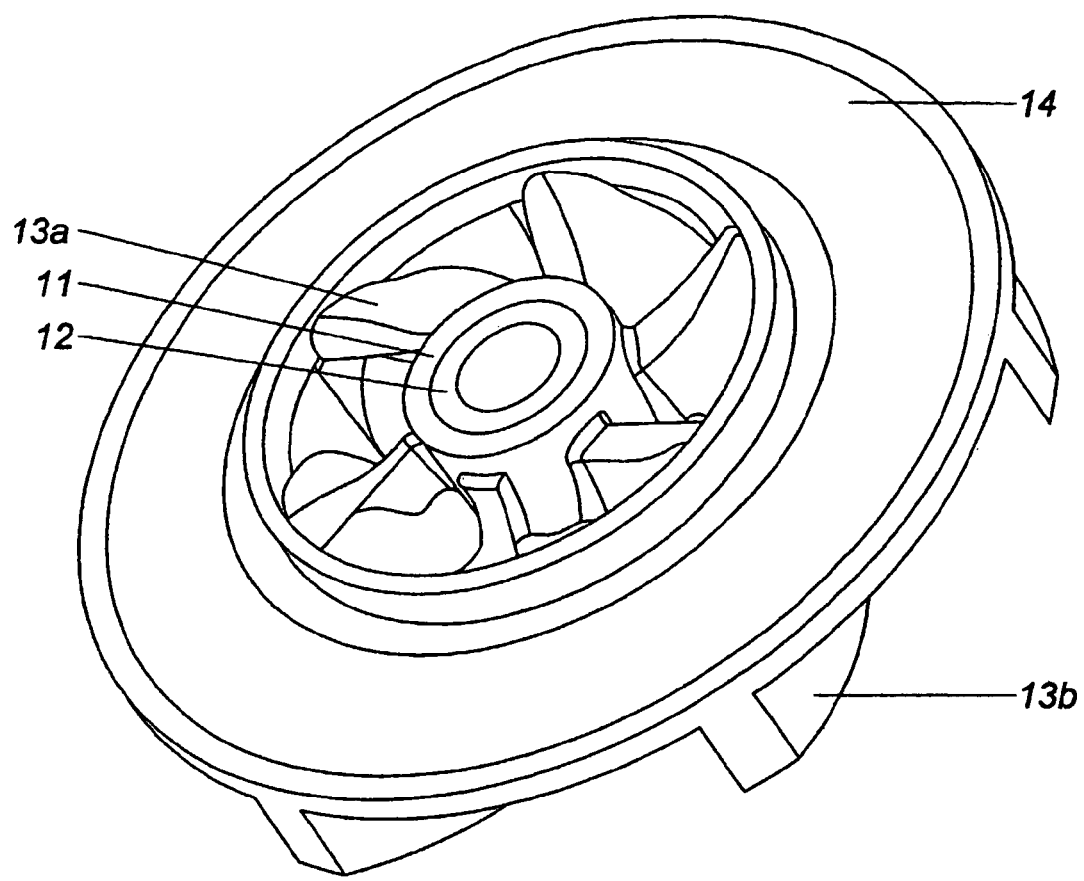
FIGS. 5 and 6 shows axonometric views of the intake side and of the pressure side.
Figure 6:
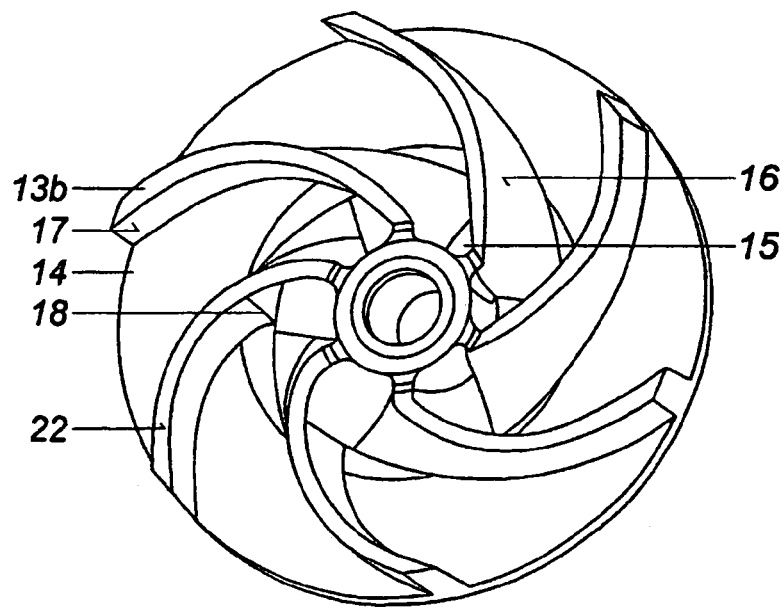

The radial pump of FIG. 1 consists of a housing 1 which is shown only partly and comprises a bearing part 2 and the housing wall 23. A pump shaft 4 is held by a bearing 3 which his only shown schematically, with an impeller 5 being fastened to the one end of the pump shaft. A pulley 6 for driving the pump is arranged at the opposite end of the pump shaft 4. A pump lid 7 is fastened to the housing wall 23, which lid encloses the intake chamber 8 of the pump. The pressure chamber 9 of the pump is arranged in the radial direction outside of the impeller 5. An axial face seal 10 seals the intake chamber 8 and the pressure chamber 9 relative to the bearing part 2. The impeller 5 consists of a hub section 11 which is fastened to the pump shaft 4 by way of a bushing 12. Blades 13 proceed from the outer circumference of the hub section 11, which blades are configured for conveying the conveyed medium. The blades 13 are joined integrally with a cover disc 14 on the intake side, which disc comprises a central opening 15 through which the conveyed medium is drawn in. On the opposite side, the impeller 5 is completely open, meaning that the blades 13 comprise a free face surface which is not covered.

The blades 13 comprise an inner section 13a in the region of the opening 15 and an outer section 13b in the region of the cover disc 14. The diameter d of the opening 15 is half the diameter D of the impeller 5.

The inner section 13a of the blades 13 is curved in a worm-like manner, such that it is free from any overlapping or intersections in the axial direction in order to ensure a simple removability from the mold. In the outer section 13b the blade 13 have a rectangular cross section (apart from any casting inclines) which is rectangular to the cover disc 14 in order to secure in this case too an easy removability from the mold.

A convex surface 16 of the blades 13 extends in a smooth surface from the inner section 13a to the outer section 13b. Opposite of the convex surface 16 there is a concave surface 17. An edge 18 is formed in the concave surface 17 from the inner section 13a to the outer section 13b. This edge is required for casting purposes. The cover disc 14 is rounded off at the transitional point to the opening 15 close to 20 in order to achieve an optimal flow deflection. An axial projection 21 in the region of the opening 15 allows a further optimization of the flow. In the outer section 13b the blades 13 comprise a face surface 22 on the pressure side which is situated in a plane perpendicular to the axis 24 of the impeller 5.

Figure 7:
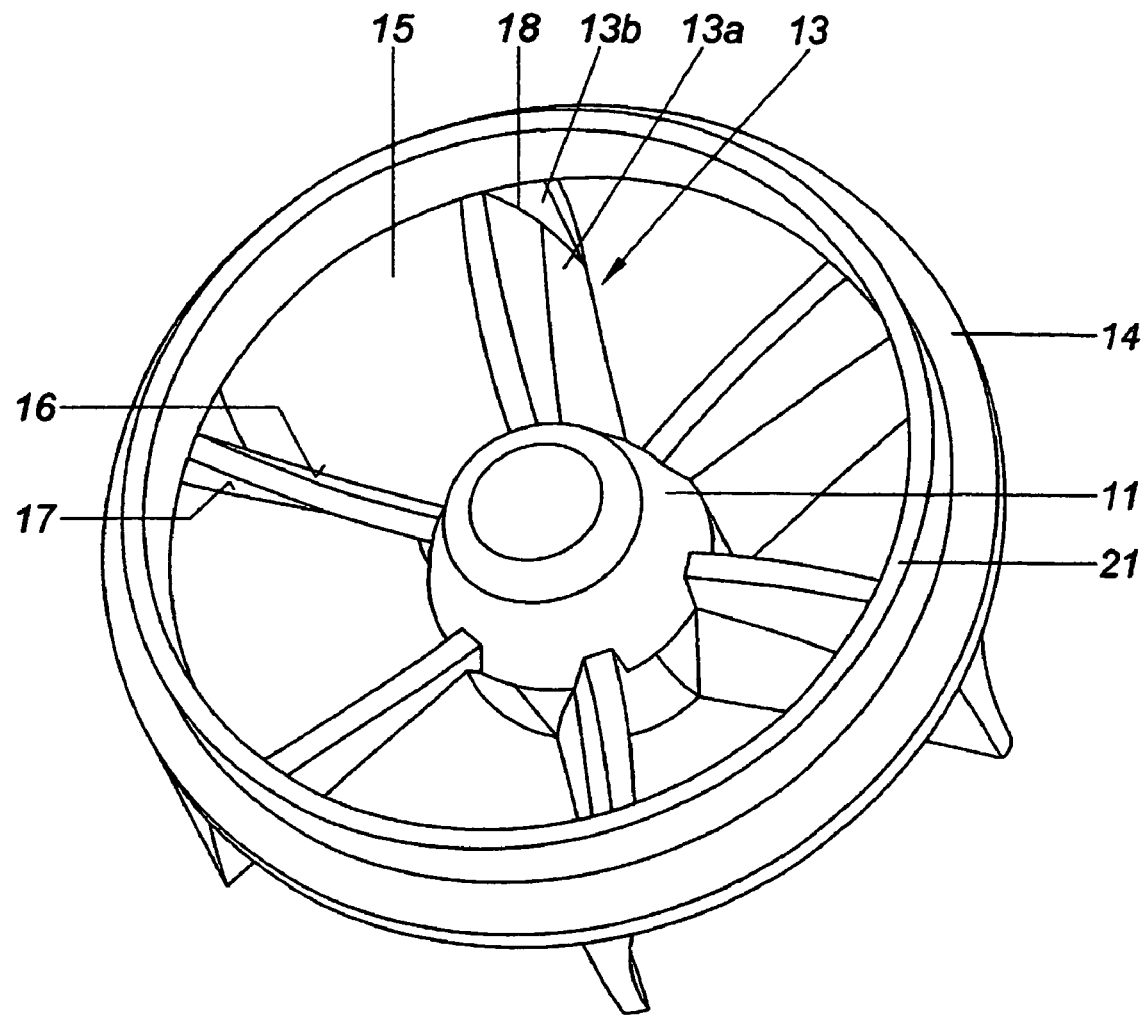
FIG. 7 shows an impeller for an axial pump in an axonometric view.

FIG. 7 shows an axial impeller. Similar parts are shown with the same reference numerals. The proportions differ especially with respect to the above embodiments. Obviously, the opening 15 is substantially larger than in the radial variant. Axial pumps with such an impeller will be necessary in cases where the outside diameter is limited for constructional reasons. In particular, multi-stage embodiments will be considered.

Pumps with a high efficiency can be produced in a cost-effective manner with the impeller in accordance with the invention, which are comparable with pumps with closed impellers. As a result of its easy removability from the mold, the impeller can be produced very easily from a casting viewpoint. Moreover, such an impeller has outstanding cavitation properties.

The invention claimed is:

1. An impeller for a cooling water pump of an internal combustion engine, comprising a hub, a cover disk which is disposed on an intake side of the impeller and is provided with a central opening for sucking in a conveyed medium, and a plurality of blades which are joined integrally with the cover disk and are provided with an inner section located in the region of the central opening and an outer section located in the region of the cover disk, said impeller being provided with a completely open configuration on a pressure side of the impeller opposite the cover disk and the blades are shaped at least in said inner section with a three-dimensional curvature and in said outer section with a substantially two-dimensional curvature, wherein an axial projection is provided on the cover disk in the region of the central opening, which projection projects in the direction of the intake side, and wherein one blade on the intake side is flush with a front edge of the axial projection.

2. An impeller according to claim 1, wherein the blades are free from undercuts.

3. An impeller according to claim 1, wherein the blades are curved in a two-dimensional manner in the region of the cover disk and are rectangular to the plane of the cover disk.

4. An impeller according to claim 1, wherein the cover disk is rounded off in the region of the central opening.

5. An impeller according to claim 1, wherein the blades are provided at least in the outer section on the pressure side with a face surface which is situated in a plane perpendicular to the axis of the impeller.

6. An impeller according to claim 1, wherein the blades have a convex surface which converges smoothly from the inner section to the outer section.

7. An impeller according to claim 1, wherein the blades comprise a concave surface which converges with an edge from the inner section to the outer section.

8. An impeller according to claim 1, wherein the blades have in the outer section a substantially rectangular cross section.

9. An impeller according to claim 1, wherein the blades in the outer section have at least partly a trapezoidal cross section.

10. An impeller according to claim 1, wherein the impeller comprises radial discharge openings.

11. An impeller according to claim 1, wherein the diameter of the opening of the cover disk corresponds to 30% to 70% of the diameter of the impeller.

12. A pump for an internal combustion engine, with a bearing in which a pump shaft is held rotatably which passes through a wall of a housing and to which is fastened an impeller with axial an intake opening on the side of the housing wall opposite of the bearing and with radial discharge, said impeller comprising a hub, a cover disk which is disposed on an intake side of the impeller and is provided with a central opening for sucking in a conveyed medium and a projection which extends from the intake side, and a plurality of blades which are joined integrally with the cover disk on the intake side and are provided with an inner section located in the region of the central opening and an outer section located in the region of the cover disk, said impeller being further provided with a completely open configuration on a pressure side of the impeller opposite the cover disk and blades are shaped at least in said inner section with a three-dimensional curvature and in said outer section with a substantially two-dimensional curvature, one of said blades being flush on the intake side with a front edge of the axial projection.

13. A pump according to claim 12, wherein an axial face seal for sealing the pump shaft is provided in the wall of the housing, which seal is situated openly in the flow of the conveyed medium.

14. A pump according to claim 12, wherein the wall of the housing is directly adjacent to a face side of the blades.

* * * * *